US012775060B2

(12) United States Patent
Ray et al.

(10) Patent No.: US 12,775,060 B2
(45) Date of Patent: Oct. 27, 2026

(54) IDENTIFICATION OF WEARABLE DEVICE LOCATIONS

(71) Applicant: Meta Platforms Technologies, LLC, Menlo Park, CA (US)

(72) Inventors: Siddharth Ray, Sunnyvale, CA (US); Shivank Nayak, Milpitas, CA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 277 days.

(21) Appl. No.: 18/487,599

(22) Filed: Oct. 16, 2023

(65) Prior Publication Data

US 2024/0133996 A1 Apr. 25, 2024
US 2024/0230830 A9 Jul. 11, 2024

Related U.S. Application Data

(60) Provisional application No. 63/417,545, filed on Oct. 19, 2022.

(51) Int. Cl.
*G01S 5/02* (2010.01)
*H04W 4/02* (2018.01)

(52) U.S. Cl.
CPC ........... *G01S 5/0295* (2020.05); *H04W 4/023* (2013.01); *H04W 4/025* (2013.01)

(58) Field of Classification Search
CPC ...... G01S 5/0295; H04W 4/023; H04W 4/025
See application file for complete search history.

(56) References Cited

U.S. PATENT DOCUMENTS

| | | | |
|---|---|---|---|
| 9,104,698 | B2 | 8/2015 | Tysowski |
| 9,154,917 | B2 | 10/2015 | Venkatraman et al. |
| 9,232,349 | B2 | 1/2016 | Mikan et al. |
| 10,198,828 | B2 | 2/2019 | Park et al. |
| 10,871,934 | B2 | 12/2020 | Paulovich et al. |
| 11,087,553 | B2 | 8/2021 | Varshney et al. |

(Continued)

FOREIGN PATENT DOCUMENTS

WO 2013055413 A1 4/2013

OTHER PUBLICATIONS

Zhang Y., et al., “NaviGlass: Indoor Localization Using Smart Glasses,” Proceedings of the 2016 International Conference on Embedded Wireless Systems and Networks, Feb. 15, 2016, pp. 205-216.

*Primary Examiner* — Erika A Washington
(74) *Attorney, Agent, or Firm* — Morgan, Lewis & Bockius LLP

(57) ABSTRACT

According to examples, a wearable device may include an imaging component, at least one wireless communication component, and a controller. The controller may activate the at least one wireless communication component to perform a wireless scan of at least one radio available to respond to the wireless scan. The controller may also receive, through the at least one wireless communication component, wireless scan data from the at least one radio and may embed the wireless scan data as part of a media metadata. The wireless scan data may be used to determine a location estimate of the at least one radio and thus, the wearable device. The location estimate of the wearable device may also be used to geotag media captured by the wearable device without using a GPS receiver on the wearable device or when a GPS receiver is unable to track a current location.

19 Claims, 8 Drawing Sheets

(56) References Cited

U.S. PATENT DOCUMENTS

| | | | | |
|---|---|---|---|---|
| 2016/0026853 | A1* | 1/2016 | Wexler | G01S 3/7864 382/103 |
| 2018/0329662 | A1* | 11/2018 | Cronin | G02B 27/017 |
| 2022/0159178 | A1 | 5/2022 | Bartow et al. | |
| 2022/0237399 | A1* | 7/2022 | Kowalski | G06F 18/214 |
| 2023/0281254 | A1* | 9/2023 | Kocienda | G06F 16/24568 707/722 |

* cited by examiner

520

600

IDENTIFICATION OF WEARABLE DEVICE LOCATIONS

TECHNICAL FIELD

This patent application relates generally to wearable devices that include imaging components and wireless communication components. Particularly, the wireless communication components are used to receive wireless scan data from at least one radio through performance of wireless scans. The wireless scan data includes information regarding the radio environment, which is used to determine an estimated location of a wearable device. The estimated location of the wearable device may be used to geo-tag media captured by the wearable device.

BACKGROUND

With recent advances in technology, prevalence and proliferation of content creation and delivery have increased greatly in recent years. In particular, interactive content, such as virtual reality (VR) content, augmented reality (AR) content, mixed reality (MR) content, and content within and associated with a real and/or virtual environment (e.g., a "metaverse") has become appealing to consumers.

Wearable devices, such as a wearable eyewear, wearable headsets, head-mountable devices, and smartglasses, have gained in popularity as forms of wearable systems. In some examples, such as when the wearable devices are eyeglasses or smartglasses, the wearable devices may include transparent or tinted lenses. In some examples, such as when the wearable devices are head-mountable devices or smartglasses, the wearable devices may employ a first projector and a second projector to direct light associated with a first image and a second image, respectively, through one or more intermediary optical components at each respective lens, to generate "binocular" vision for viewing by a user. In some examples, wearable devices may also employ imaging components to capture image content, such as photographs and videos.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

DETAILED DESCRIPTION

Figure 1:
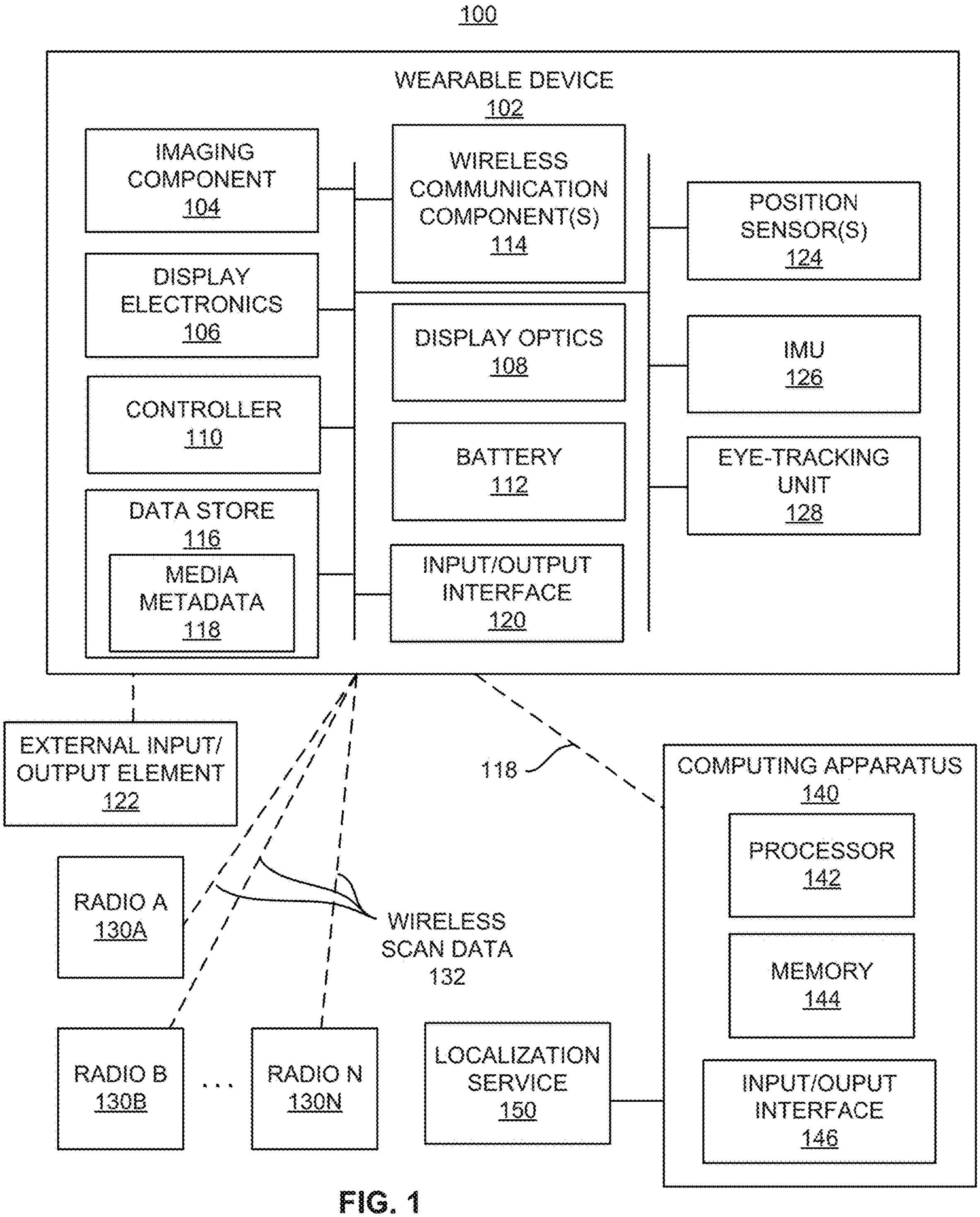
FIG. 1 illustrates a block diagram of an environment including a wearable device having an imaging component, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

Users of social media applications often capture media, e.g., photos and videos, and upload the captured media to the social media applications to share with friends and followers. Oftentimes, the media is tagged with location information such that the media may be displayed on a map according to the locations at which the media were captured. Typically, the devices that are used to capture the media, such as smartphones, include a global positioning system (GPS) receiver that tracks the locations of the devices. Other types of devices, for instance, those that may not be equipped with a GPS receiver, may employ wireless fidelity (WiFi) based positioning techniques.

There are, however, some drawbacks to the use of GPS receivers and WiFi-based positioning techniques. For instance, in many situations, such as when the user is indoors or at a remote location where GPS signals may not be sufficiently strong, the GPS receivers may be unable to determine their locations. Additionally, it may not be practical to employ GPS receivers in certain types of devices, such as smartglasses, due to the amount of space used and the amount of energy consumed by the GPS receivers. The implementation of WiFi-based positioning techniques on such devices may also suffer from some drawbacks as this technique may require a relatively large amount of energy, which may quickly drain batteries on the devices. Additionally, the WiFi-based positioning techniques may require that the devices maintain connectivity for network calls, which may sometimes be poor when the media is captured.

Disclosed herein are wearable devices, such as smartglasses, head-mountable devices, etc., that enable the locations at which media have been captured by the wearable devices to be identified and included in the media metadata. The locations are determined without the use of a Global Positioning System (GPS) receiver on the wearable devices and without performing WiFi-based positioning techniques on the wearable devices. Instead, wireless scan data is received from one or more radios and the wireless scan data is embedded into the media metadata. The media metadata may be stored in the wearable devices and may be communicated to a computing apparatus, such as a smartphone, smartwatch, etc. The computing apparatus may use the wireless scan data to determine a location of the radio that transmitted the wireless scan data, which the computing apparatus may use as the approximate location at which the media was captured. The computing apparatus may store the approximate location information in the media metadata to geotag the media.

In some examples, the wearable devices generate notifications with identifiers of media following the capture of the media. The wearable devices may send the notifications to the computing apparatus. The computing apparatus may determine its location, for instance, through use of a GPS receiver, WiFi-based positioning, or the like, and may generate a tuple that includes the identifier of the media and the location of the computing apparatus. The computing apparatus may also store the tuple in the media metadata to thus geotag the media.

Through implementation of the features of the present disclosure, media captured by wearable devices may be geotagged in simple and energy-efficient manners. That is, media captured by wearable devices, such as smartglasses, may be geotagged without consuming a relatively large amount of energy from batteries contained in the wearable devices. A technical improvement afforded through implementation of the features of the present disclosure may be that media may be geotagged without having to use GPS receivers or WiFi positioning techniques on the wearable devices. Another technical improvement afforded through implementation of the features of the present disclosure may be that media may be geotagged without significantly increasing energy consumed by the wearable devices.

FIG. 1 illustrates a block diagram of an environment 100 including a wearable device 102 having an imaging component 104, according to an example. The wearable device 102 may be a "near-eye display", which may refer to a device (e.g., an optical device) that may be in close proximity to a user's eye. As used herein, "artificial reality" may refer to aspects of, among other things, a "metaverse" or an environment of real and virtual elements, and may include use of technologies associated with virtual reality (VR), augmented reality (AR), and/or mixed reality (MR). As used herein a "user" may refer to a user or wearer of a "near-eye display."

Figure 2:
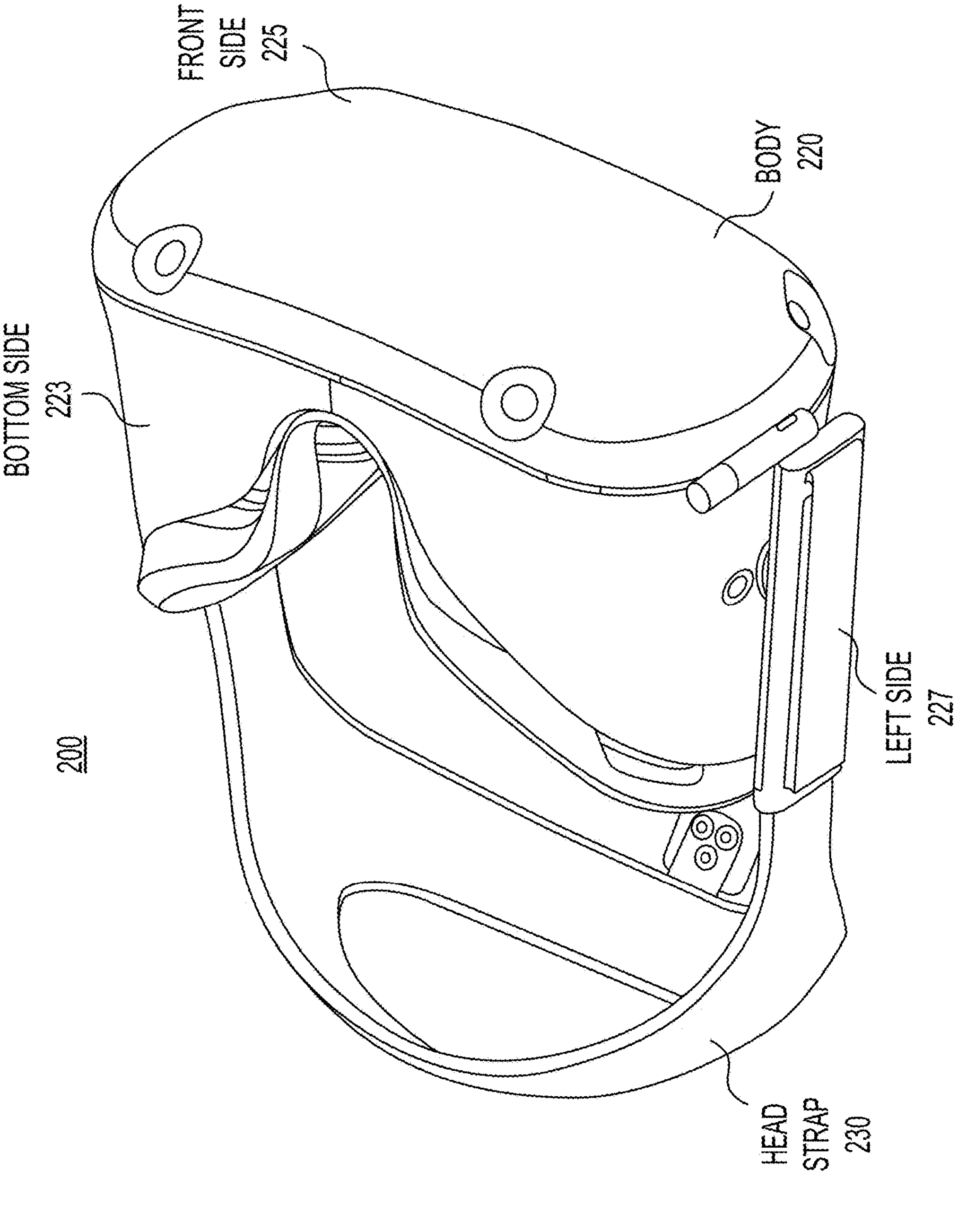
FIG. 2 illustrates a perspective view of a wearable device, such as a near-eye display device, and particularly, a head-mountable display (HMD) device, according to an example.
Figure 3:
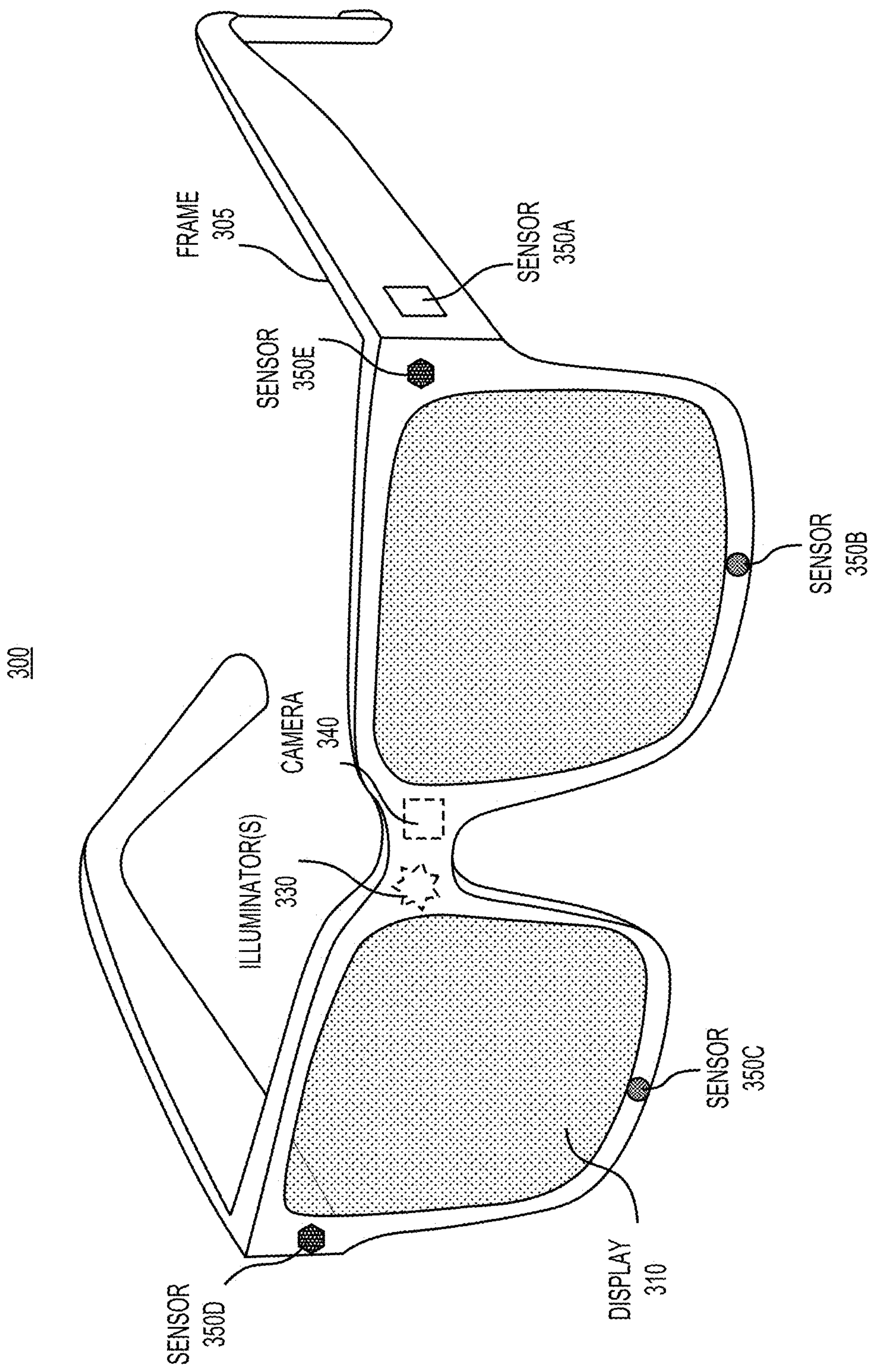
FIG. 3 illustrates a perspective view of a wearable device, such as a near-eye display, in the form of a pair of smartglasses, glasses, or other similar eyewear, according to an example.

The wearable device 102 may be wearable eyewear, a wearable headset, smart glasses, a head-mountable device, eyeglasses, or the like. Examples of wearable devices 102 are depicted in FIGS. 2 and 3 and are described in greater detail herein below. In FIG. 1, the wearable device 102 is depicted as including an imaging component 104 through which media, such as images and/or videos, are to be captured. For instance, a user of the wearable device 102 may control the imaging component 104 to capture an image or video that is imaged through the imaging component 104.

The wearable device 102 is also depicted as including display electronics 106 and display optics 108. The display electronics 106 and the display optics 108 may be optional in that, in some examples, the wearable device 102 may not display images, but instead, may include lenses, in which a user may see through the lenses. In some examples in which the wearable device 102 includes the display electronics 106 and the display optics 108, the display electronics 106 may display or facilitate the display of images to the user according to received data. For instance, the display electronics 106 may receive data from the imaging component 104 and may facilitate the display of images captured by the imaging component 104. The display electronics 106 may also or alternatively display images, such as graphical user interfaces, videos, still images, etc., from other sources. In some examples, the display electronics 106 may include one or more display panels. In some examples, the display electronics 106 may include any number of pixels to emit light of a predominant color such as red, green, blue, white, or yellow. In some examples, the display electronics 106 may display a three-dimensional (3D) image, e.g., using stereoscopic effects produced by two-dimensional panels, to create a subjective perception of image depth.

In some examples, the display optics 108 may display image content optically (e.g., using optical waveguides and/or couplers) or magnify image light received from the display electronics 106, correct optical errors associated with the image light, and/or present the corrected image light to a user of the wearable device 102. In some examples, the display optics 108 may include a single optical element or any number of combinations of various optical elements as well as mechanical couplings to maintain relative spacing and orientation of the optical elements in the combination. In some examples, one or more optical elements in the display optics 108 may have an optical coating, such as an anti-reflective coating, a reflective coating, a filtering coating, and/or a combination of different optical coatings.

In some examples, the display optics 108 may also be designed to correct one or more types of optical errors, such as two-dimensional optical errors, three-dimensional optical errors, or any combination thereof. Examples of two-dimensional errors may include barrel distortion, pincushion distortion, longitudinal chromatic aberration, and/or transverse chromatic aberration. Examples of three-dimensional errors may include spherical aberration, chromatic aberration field curvature, and astigmatism.

As also shown in FIG. 1, the wearable device 102 includes a controller 110 that may control operations of various components of the wearable device 102. The controller 110 may be a semiconductor-based microprocessor, a central processing unit (CPU), an application-specific integrated circuit (ASIC), a field-programmable gate array (FPGA), and/or other hardware device. The controller 110 may be programmed with software and/or firmware that the controller 110 may execute to control operations of the components of the wearable device 102. For instance, the controller 110 may execute instructions to cause the imaging component 104 to capture media, e.g., still and/or video images. In some examples, the controller 110 may execute instructions to cause the display electronics 106 to display the media on the display optics 108. By way of example, the displayed images may be used to provide a user of the wearable device 102 with an augmented reality experience such as by being able to view images of the user's surrounding environment along with other displayed images.

FIG. 1 further shows the wearable device 102 as including a battery 112, e.g., a rechargeable battery. When the wearable device 102 is not connected to an external power source, the battery 112 provides power to the components in the wearable device 102. In order to reduce or minimize the size and weight of the wearable device 102, the battery 112 may have a relatively small form factor and may thus provide relatively limited amount of power to the wearable device 102.

In many instances, users of the wearable device 102 may wish to capture media and to tag the captured media, e.g., the images and/or videos, with geolocation data. The geolocation data may be geographic coordinate data, such as latitude and longitude coordinates. The geolocation data may also or alternatively include place names, such as country name, county name, city name, street name, business name, etc. In other words, users may wish to geotag the captured media such that, for instance, the location at which the media was captured may be identified. The geotag may be included in metadata of the media such that, for instance, the location information may be used in identifying images captured at or near certain locations. The location information may also be used to display the media on maps at the approximate locations at which the media were captured.

In order to geotag the media, identification of the locations at which the media are captured may be employed. For instance, a global positioning system (GPS) receiver, such as a GPS tracking unit, a geotracking unit, or the like, may be employed. In many instances, however, it may be undesirable to include a GPS receiver in the wearable device 102 because the GPS receiver may consume a relatively large amount of power from the battery 112 and may take up a relatively large amount of space in the wearable device 102. Additionally, the GPS receiver may not work when the wearable device 102 does not have a GPS signal, such as when the wearable device 102 is indoors, underground, in a garage, or the like.

According to examples, the controller 110 is to execute instructions that are intended to enable the locations at which media have been captured to be determined without the use of a GPS receiver on the wearable device 102. Particularly, the controller 110 may cause wireless scan data 132 to be retrieved from at least one available radio 130A-130N, in which the variable "N" represents a value greater than one. The at least one available radio 130A-130N may be a radio 130A-130N that may be within range of the wearable device 102 to enable the wireless scan data 132 to be communicated to the wearable device 102. The radios 130A-130N may be any of WiFi radios, Bluetooth™ radios, cellular radios, etc., which facilitate communication of data over a network, such as the Internet. For instance, the radios 130A-130N may be access points, routers, gateways, and/or the like.

As discussed herein, the wireless scan data 132 may include information that may be used to identify the location of a radio 130A that provided the wireless scan data 132. The location of the radio 130A may be used to determine an approximate location of the wearable device 102. As a result, the approximate location of the wearable device 102 may be determined when a GPS receiver is not used and/or a GPS receiver is unable to determine its location. In addition, the approximate location may be used to geotag media captured by the wearable device 102.

Particularly, the controller 110 may activate at least one wireless communication component 114 of the wearable device 102 to retrieve the wireless scan data 132 from one or more of the radios 130A-130N. The wireless communication component(s) 114 may include one or more antennas and any other components and/or software to enable wireless transmission and receipt of radio waves. For instance, the wireless communication component(s) 114 may include an antenna through which wireless fidelity (WiFi) signals may be transmitted and received. As another example, the wireless communication component(s) 114 may include an antenna through which Bluetooth™ signals may be transmitted and received. As a yet further example, the wireless communication component(s) 114 may include an antenna through which cellular signals may be transmitted and received. In some examples, the wireless communication component(s) 114 may transmit and receive data through multiple ranges of wavelengths and thus, may transmit and receive data across multiple ones of WiFi, Bluetooth™, cellular, ultra-wideband (UWB), etc., radio wavelengths.

According to examples, the controller 110 is programmed or accesses and executes machine-readable instructions that cause the controller 110 to activate the wireless communication component(s) 114. Particularly, the controller 110 activates the wireless communication component(s) 114 to make a wireless connection with or otherwise communicate with one or more of the radios 130A-130N. When the wireless communication component(s) 114 makes a wireless connection with a radio 130A, the radio 130A communicates information pertaining to the radio 130A and thus, the controller 110 may receive, through the at least one wireless communication component 114, the wireless scan data 132 from one or more of the radios 130A-130N.

In instances in which the radio 130A operates in the WiFi wavelength range, the radio 130A may communicate a WiFi service set identifier (SSID), a received signal strength indicator (RSSI), round trip delay (RTT), and/or the like. In instances in which the radio 130A operates in the BT wavelength range, the radio 130A may communicate a Bluetooth™ identifier, a RSSI, and/or the like. As a further example, in instances in which the radio 130A operates in the cellular wavelength range, the radio 130A may communicate a cellular enhanced cell identifier (ECID), a cellular reference signal received power (RSRP), and/or the like. When using data such as RSSI or RTT, the location of the radio 130A may be determined through triangulation, which may rely upon the locations of access points in a wireless network. Alternatively, the location of the radio 130A may be determined through fingerprint matching.

According to examples, the controller 110 may embed the wireless scan data 132 as part of a media metadata 118. Particularly, the controller 110 may generate metadata 118 corresponding to media captured by the imaging component 104. In other words, the controller 110 may generate the metadata 118 as an exchangeable image file format (EXIF) file. The media metadata 118 may include text information pertaining to a file of the media, details relevant to the media, information about production of the media, and/or the like. In some examples, the controller 110 may embed or otherwise insert the wireless scan data 132 in a field of the media metadata 118.

The controller 110 may also store the media metadata 118 in a data store 116 that may be locally contained in the wearable device 102. The data store 116 may be, for example, Read Only Memory (ROM), flash memory, solid state drive, Random Access memory (RAM), an Electrically Erasable Programmable Read-Only Memory (EEPROM), a storage device, or the like. In some examples, the data store 116 may have stored thereon instructions (not shown) that the controller 110 may execute as discussed herein.

The wearable device 102 is also depicted as including an input/output interface 120 through which the wearable device 102 may receive input signals and may output signals. The input/output interface 120 may interface with one or more control elements, such as power buttons, volume buttons, a control button, a microphone, the imaging component 104, and other elements through which a user may perform input actions on the wearable device 102. A user of the wearable device 102 may thus control various actions on the wearable device 102 through interaction with the one or more control elements, through input of voice commands, through use of hand gestures within a field of view of the imaging component 104, through activation of a control button, etc.

The input/output interface 120 may also or alternatively interface with an external input/output element 122. The external input/output element 122 may be a controller with multiple input buttons, a keyboard, a mouse, a game controller, a glove, a button, a touch screen, or any other suitable device for receiving action requests from users and communicating the received action requests to the wearable device 102. A user of the wearable device 102 may control various actions on the wearable device 102 through interaction with the external input/output element 122, which may include physical inputs and/or voice command inputs. The controller 110 may also output signals to the external input/output element 122 to cause the external input/output element 122 to provide feedback to the user. The signals may cause the external input/output element 122 to provide a tactile feedback, such as by vibrating, to provide an audible feedback, to provide a visual feedback on a screen of the external input/output element 122, etc.

According to examples, a user of the wearable device 102 may use either of the input/output interface 120 and the external input/output element 122 to cause the imaging component 104 to capture images. In some examples, the controller 110 is to cause the media metadata to be generated when files containing data corresponding to the captured images are stored, for instance, in the data store 116. In addition, the controller 110 is to cause the wireless communication component(s) 114 to become activated and perform a wireless scan of radios 130A-130N available to respond to the wireless scan in response to the images being captured and/or the data corresponding to the images stored.

In some examples, the controller 110 may cause the wireless communication component(s) 114 to become activated and perform the wireless scans at other times. For instance, the controller 110 may activate the wireless communication component(s) 114 to receive the wireless scan data 132 periodically, e.g., at set intervals of time. In other examples, the controller 110 may determine a schedule, e.g., timings at which, the wireless communication component(s) 114 is to be activated to perform the wireless scan of the one or more available radios 130A-130N based on a context associated with the wearable device 102. The context associated with the wearable device 102 may be a condition or operation of the wearable device 102 in which a life of the battery 112 is to be enhanced. For instance, the controller 110 may determine the schedule based on a determination as to whether the wearable device 102 is stationary or moving (e.g., a physical location of the wearable device 102 over a period of time), a time since a last scan was performed, whether the wearable device 102 is housed within a case, whether the wearable device 102 is being used, etc. By way of example, the controller 110 may determine the schedule between scans to be reduced when the wearable device 102 is being used and/or moved and to be increased when the wearable device 102 is stationary and/or housed within a case.

In any of the examples above, the controller 110 may activate the wireless communication component(s) 114 according to the determined schedule and the controller 110 may cache the wireless scan data 132 received from the one or more radios 130A-130N. The controller 110 may also store a timestamp of when the wireless scan was performed and a timestamp of when the media was captured. In addition, the controller 110 may embed the wireless scan data 132 having a timestamp that is in closest proximity in time to when the media was captured to a media metadata 118.

In some examples, the wearable device 102 includes one or more position sensors 124 that may generate one or more measurement signals in response to motion of the wearable device 102. Examples of the one or more position sensors 124 may include any number of accelerometers, gyroscopes, magnetometers, and/or other motion-detecting or error-correcting sensors, or any combination thereof. In some examples, the wearable device 102 may include an inertial measurement unit (IMU) 126, which may be an electronic device that generates fast calibration data based on measurement signals received from the one or more position sensors 124. The one or more position sensors 124 may be located external to the IMU 126, internal to the IMU 126, or any combination thereof. Based on the one or more measurement signals from the one or more position sensors 124, the IMU 126 may generate fast calibration data indicating an estimated position of the wearable device 102 that may be relative to an initial position of the wearable device 102. For example, the IMU 126 may integrate measurement signals received from accelerometers over time to estimate a velocity vector and integrate the velocity vector over time to determine an estimated position of a reference point on the wearable device 102. Alternatively, the IMU may provide the sampled measurement signals to a computing apparatus 140, which may determine the fast calibration data.

The wearable device 102 may also include an eye-tracking unit 128 that may include one or more eye-tracking systems. As used herein, "eye-tracking" may refer to determining an eye's position or relative position, including orientation, location, and/or gaze of a user's eye. In some examples, an eye-tracking system may include an imaging system that captures one or more images of an eye and may optionally include a light emitter, which may generate light that is directed to an eye such that light reflected by the eye may be captured by the imaging system. In other examples, the eye-tracking unit 128 may capture reflected radio waves emitted by a miniature radar unit. These data associated with the eye may be used to determine or predict eye position, orientation, movement, location, and/or gaze.

In some examples, the display electronics 106 may use the orientation of the eye to introduce depth cues (e.g., blur image outside of the user's main line of sight), collect heuristics on the user interaction in the virtual reality (VR) media (e.g., time spent on any particular subject, object, or frame as a function of exposed stimuli), some other functions that are based in part on the orientation of at least one of the user's eyes, or any combination thereof. In some examples, because the orientation may be determined for both eyes of the user, the eye-tracking unit 128 may be able to determine where the user is looking or predict any user patterns, etc.

According to examples, the wearable device 102 may be coupled to a computing apparatus 140, which is external to the head-mounting device 102. For instance, the wearable device 102 may be coupled to the computing apparatus 140 through a Bluetooth™ connection, a wired connection, a WiFi connection, or the like. The computing apparatus 140 may be a companion console to the wearable device 102 in that, for instance, the wearable device 102 may offload some operations to the computing apparatus 140. In other words, the computing apparatus 140 may perform various operations that the wearable device 102 may be unable to perform or that the wearable device 102 may be able to perform, but are performed by the computing apparatus 140 to reduce or minimize the load on the wearable device 102.

According to examples, the computing apparatus 140 is a smartphone, a smartwatch, a tablet computer, a tablet computer, a desktop computer, a server, or the like. The computing apparatus 140 is depicted as including a processor 142 and a memory 144, which may be a non-transitory computer-readable storage medium storing instructions executable by the processor 142. The processor 142 may include multiple processing units executing instructions in parallel. The memory 144 may be a hard disk drive, a removable memory, or a solid-state drive (e.g., flash memory or dynamic random access memory (DRAM)).

According to examples, the controller 110 is to output the media metadata 118 along with the data corresponding to the media to the computing apparatus 140 through the coupling with the computing apparatus 140. The processor 142 is to identify the wireless scan data 132 embedded in the media metadata 118. In some examples, the processor 142 sends the wireless scan data 132 to a localization service 150 through an input/output interface 146. For instance, the processor 142 may make a network application program interface (API) call to the localization service 150, e.g., servers that provide the localization service 150 with the wireless scan data 132.

The localization service 150 may be provided on a cloud-based server and is to determine an estimated geographic location of the radio 130A that provided the wireless scan data 132 to the wearable device 102. For instance, the localization service 150 may compare the wireless scan data 132 with estimated geographic locations stored in a database and may determine the estimated geographic locations based on the comparison. The localization service 150 may also return information regarding the estimated geographic location to the computing apparatus 140.

In other examples, the processor 142 may access a database on which correlations between wireless scan data 132 and the estimated geographic locations may be stored or cached. The database may be stored locally, e.g., in the memory 144, on a locally attached memory device, or the like. In these examples, the processor 142 may compare the wireless scan data 132 against the information stored in the database and may determine the estimated geographic location of the radio 130A that provided the wireless scan data 132 from the comparison.

In any of the examples above, the processor 142 may store data the correlates the media with the estimated geographic location information. In other words, the processor 142 may geotag the media and may store the geotag in the media metadata 118. In some examples, the wearable device 102 may not continuously be coupled with the computing apparatus 140, for instance, to conserve battery 112 life, due to the wearable device 102 being physically distanced from the computing apparatus 140, etc. As a result, the controller 110 may not communicate the media metadata 118 and the media data, e.g., data corresponding to the media, immediately after the media is captured. Instead, there may be a delay of hours or days in situations, for instance, when the user is remotely located from the computing apparatus 140. As a result, even in instances in which the computing apparatus 140 is equipped with a GPS receiver and is thus able to track its geographic location, the location of the computing apparatus 140 may not correspond to the location of the wearable device 102 when the media was captured.

According to examples, prior to communicating the media metadata 118 and the media data to the computing apparatus 140, the controller 110 may access an identifier of a captured media. In addition, the controller 110 may output a notification that contains the identifier of the captured media to the computing apparatus 140. For instance, the controller 110 may, in response to a determination that a media has been captured, generate the identifier and may output the notification to the computing apparatus 140. In response to receipt of the notification, the processor 142 of the computing apparatus 140 may create a tuple that includes the identifier and a current location of the computing apparatus 140. The computing apparatus 140, in these examples, may include a GPS receiver or may determine its location in any other suitable manner, such as through WiFi protected setup (WPS).

In these examples, the controller 110 may communicate the media data and the media metadata 118 (EXIF) to the computing apparatus 140 during a synchronization operation. Following receipt of the media data and the media metadata 118, the processor 142 may populate the media metadata 118 with the current location identification to geotag the media. The geotag information may be used to identify media that were captured at common locations with respect to each other. The geotag information may also be used to incorporate the media on a map according to the locations at which the media were captured. In this regard, the processor 142 may render the media on a map at a location on the map corresponding to the current location identification of the media.

FIG. 2 illustrates a perspective view of a wearable device 200, such as a near-eye display device, and particularly, a head-mountable display (HMD) device, according to an example. The HMD device 200 may include each of the features of the wearable device 102 discussed herein. In some examples, the HMD device 200 may be a part of a virtual reality (VR) system, an augmented reality (AR) system, a mixed reality (MR) system, another system that uses displays or wearables, or any combination thereof. In some examples, the HMD device 200 may include a body 220 and a head strap 230. FIG. 2 shows a bottom side 223, a front side 225, and a left side 227 of the body 220 in the perspective view. In some examples, the head strap 230 may have an adjustable or extendible length. In particular, in some examples, there may be a sufficient space between the body 220 and the head strap 230 of the HMD device 200 for allowing a user to mount the HMD device 200 onto the user's head. In some examples, the HMD device 200 may include additional, fewer, and/or different components. For instance, the HMD device 200 may include an imaging component 104 (not shown) in FIG. 2 through which images may be captured as discussed herein.

In some examples, the HMD device 200 may present, to a user, media or other digital content including virtual and/or augmented views of a physical, real-world environment with computer-generated elements. Examples of the media or digital content presented by the HMD device 200 may include images (e.g., two-dimensional (2D) or three-dimensional (3D) images), videos (e.g., 2D or 3D videos), audio, or any combination thereof. In some examples, the images and videos may be presented to each eye of a user by one or more display assemblies (not shown in FIG. 2) enclosed in the body 220 of the HMD device 200.

In some examples, the HMD device 200 may include various sensors (not shown), such as depth sensors, motion sensors, position sensors, and/or eye tracking sensors. Some of these sensors may use any number of structured or unstructured light patterns for sensing purposes. In some examples, the HMD device 200 may include an input/output interface 120 for communicating with a console, such as the computing apparatus 140, as described with respect to FIG. 1. In some examples, the HMD device 200 may include a virtual reality engine (not shown), that may execute applications within the HMD device 200 and receive depth information, position information, acceleration information, velocity information, predicted future positions, or any combination thereof of the HMD device 200 from the various sensors.

In some examples, the information received by the virtual reality engine may be used for producing a signal (e.g., display instructions) to the one or more display assemblies. In some examples, the HMD device 200 may include locators (not shown), which may be located in fixed positions on the body 220 of the HMD device 200 relative to one another and relative to a reference point. Each of the locators may emit light that is detectable by an external camera. This may be useful for the purposes of head tracking or other movement/orientation. It should be appreciated that other elements or components may also be used in addition or in lieu of such locators.

It should be appreciated that in some examples, a projector mounted in a display system may be placed near and/or closer to a user's eye (i.e., "eye-side"). In some examples, and as discussed herein, a projector for a display system shaped liked eyeglasses may be mounted or positioned in a temple arm (i.e., a top far corner of a lens side) of the eyeglasses. It should be appreciated that, in some instances, utilizing a back-mounted projector placement may help to reduce size or bulkiness of any required housing required for a display system, which may also result in a significant improvement in user experience for a user.

FIG. 3 illustrates a perspective view of a wearable device 300, such as a near-eye display, in the form of a pair of smartglasses, glasses, or other similar eyewear, according to an example. In some examples, the wearable device 300 may be a specific implementation of the wearable device 102 of FIG. 1, and may be configured to operate as a virtual reality display, an augmented reality display, and/or a mixed reality display. In some examples, the wearable device 300 may be eyewear, in which a user of the wearable device 300 may see through lenses in the wearable device 300.

In some examples, the wearable device 300 may include a frame 305 and a display 310. In some examples, the display 310 may be configured to present media or other content to a user. In some examples, the display 310 may include display electronics and/or display optics, similar to components described with respect to FIGS. 1-2. For example, the display 310 may include a liquid crystal display (LCD) display panel, a light-emitting diode (LED) display panel, or an optical display panel (e.g., a waveguide display assembly). In some examples, the display 310 may also include any number of optical components, such as waveguides, gratings, lenses, mirrors, etc. In other examples, the display 310 may be omitted and instead, the wearable device 300 may include lenses that are transparent and/or tinted, such as sunglasses.

In some examples, the wearable device 300 may further include various sensors 350*a*, 350*b*, 350*c*, 350*d*, and 350*e* on or within a frame 305. In some examples, the various sensors 350*a*-350*e* may include any number of depth sensors, motion sensors, position sensors, inertial sensors, and/or ambient light sensors, as shown. In some examples, the various sensors 350*a*-350*e* may include any number of image sensors configured to generate image data representing different fields of views in one or more different directions. In some examples, the various sensors 350*a*-350*e* may be used as input devices to control or influence the displayed content of the wearable device 300, and/or to provide an interactive virtual reality (VR), augmented reality (AR), and/or mixed reality (MR) experience to a user of the wearable device 300. In some examples, the various sensors 350*a*-350*e* may also be used for stereoscopic imaging or other similar application.

In some examples, the wearable device 300 may further include one or more illuminators 330 to project light into a physical environment. The projected light may be associated with different frequency bands (e.g., visible light, infra-red light, ultra-violet light, etc.), and may serve various purposes. In some examples, the one or more illuminator(s) 330 may be used as locators.

In some examples, the wearable device 300 may also include a camera 340 or other image capture unit. The camera 340, which may be equivalent to the imaging component 104, for instance, may capture images of the physical environment in the field of view. In some instances, the captured images may be processed, for example, by a virtual reality engine (not shown) to add virtual objects to the captured images or modify physical objects in the captured images, and the processed images may be displayed to the user by the display 310 for augmented reality (AR) and/or mixed reality (MR) applications. The camera 340 may also capture media for the media to be geotagged as discussed herein.

Figure 4:
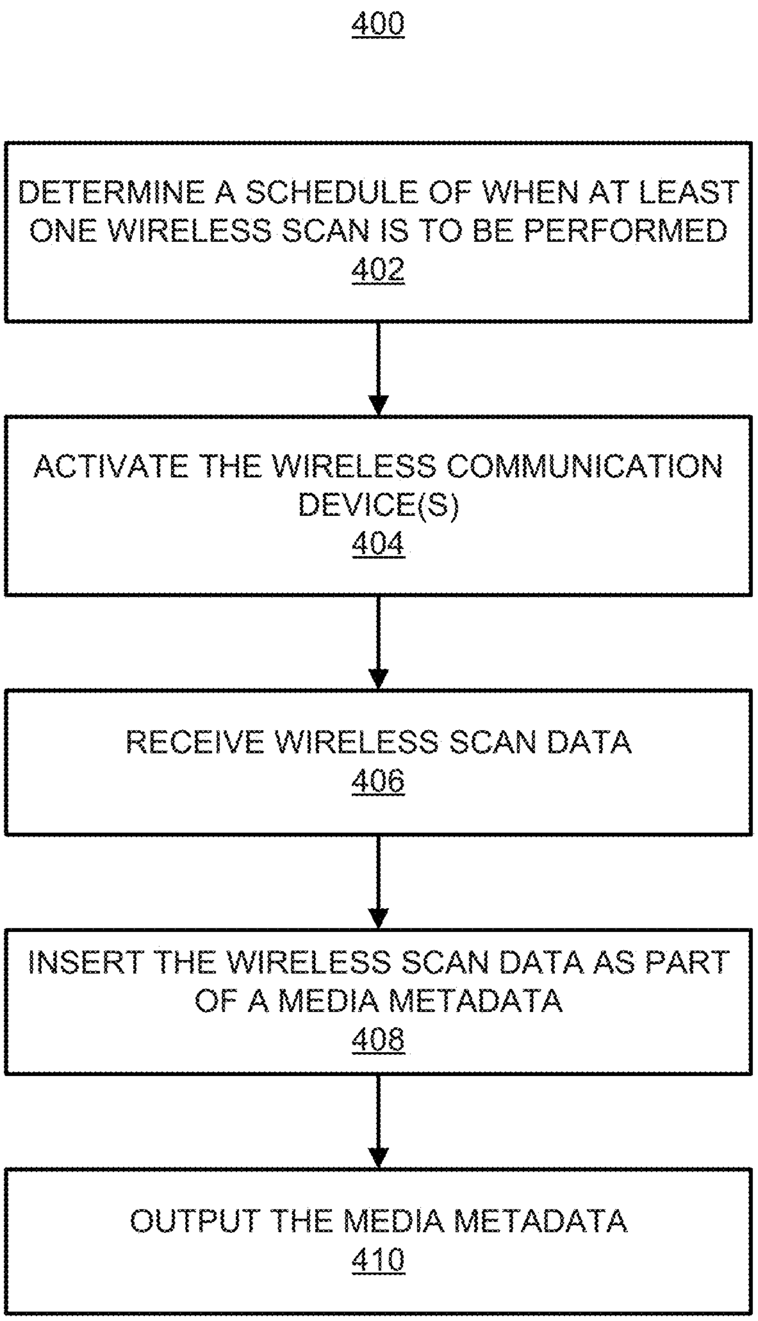
FIG. 4 illustrates a flow diagram of a method for inserting wireless scan data as part of a media metadata, in which the wireless scan data is to be employed in geotagging media, according to an example.
Figure 5A:
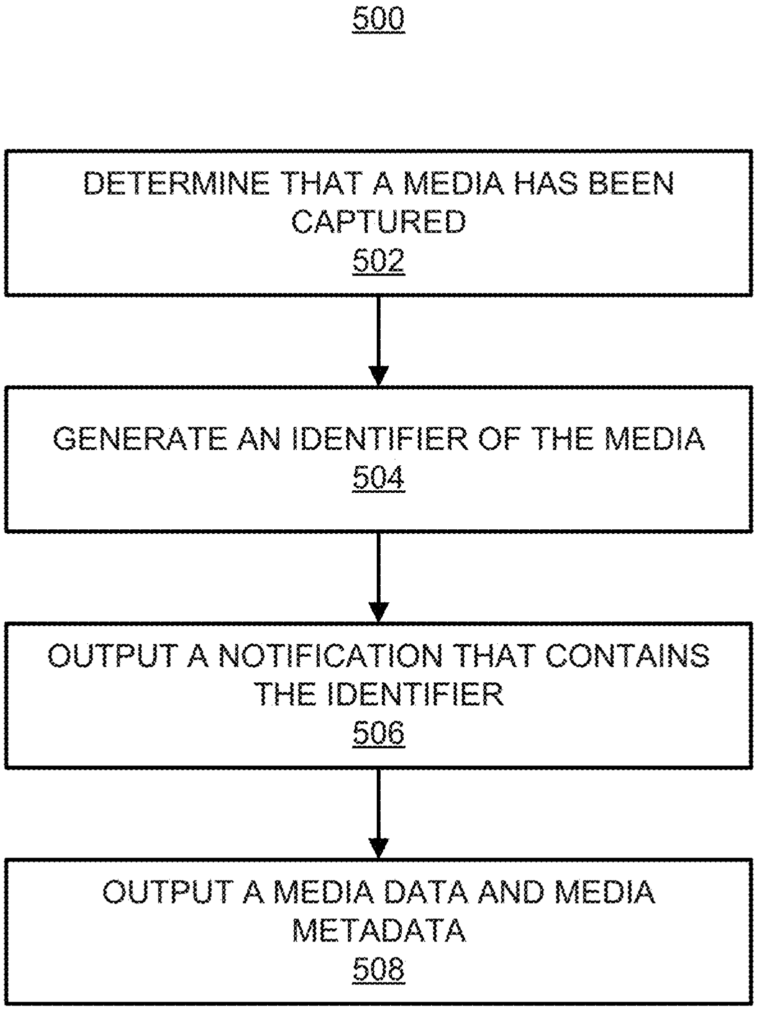
FIG. 5A illustrates a flow diagram of a method for outputting a notification that contains an identifier of a captured media to enable a location at which the media was captured to be associated with the captured media, according to an example.
Figure 5B:
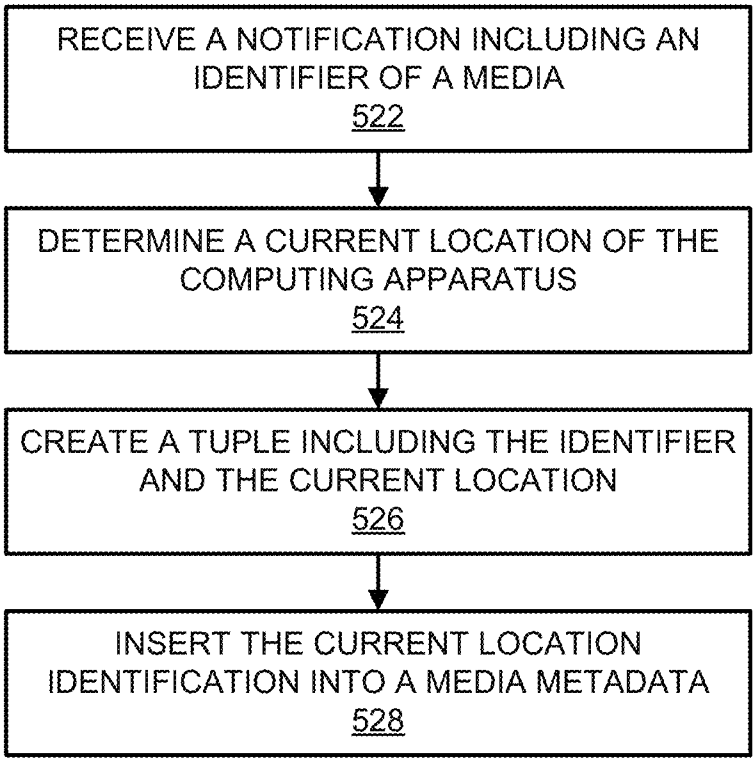
FIG. 5B illustrates a flow diagram of a method for geotagging a media, according to an example.

Various manners in which the controller 110 of the wearable device 102 may operate are discussed in greater detail with respect to the methods 400, 500, and 520 respectively depicted in FIGS. 4, 5A, and 5B. FIG. 4 illustrates a flow diagram of a method 400 for inserting wireless scan data as part of a media metadata, in which the wireless scan data is to be employed in geotagging media, according to an example. FIG. 5A illustrates a flow diagram of a method 500 for outputting a notification that contains an identifier of a captured media to enable a location at which the media was captured to be associated with the captured media, according to an example. FIG. 5B illustrates a flow diagram of a method 520 for geotagging a media, according to an example.

It should be understood that the methods 400, 500, and 520 respectively depicted in FIGS. 4, 5A, and 5B may include additional operations and that some of the operations described therein may be removed and/or modified without departing from the scopes of the methods 400, 500, and/or 520. The descriptions of the methods 400, 500, and 520 are made with reference to the features depicted in FIG. 1 for purposes of illustration.

With reference first to FIG. 4, at block 402, the controller 110 is to determine a schedule of when, e.g., a timing at which, a wireless scan is to be performed. In some examples, the controller 110 may determine that the wireless scan is to be performed after a determination that the imaging component 104 captured a media, such as an image or a video. In some examples, the controller 110 may determine that the wireless scan is to be performed based on a condition or operation of the wearable device 102. As discussed herein, the context associated with the wearable device 102 may be a condition or operation in which a life of the battery 112 is to be enhanced, e.g., maximized, optimized, etc.

At block 404, the controller 110 is to activate at least one wireless communication component 114 to perform a wireless scan of at least one of the radios 130A-130N available to respond to the wireless scan. The controller 110 may activate the wireless communication component(s) 114 according to the determined schedule, which may include activation of the wireless communication component(s) 114 following capture of a media and generation of a media file corresponding to the captured media. In response to receipt of the wireless scan, one or more of the radios 130A-130N may output wireless scan data 132 to the wireless communication component(s) 114. At block 406, the controller 110 is to receive the wireless scan data 132 from the available radio(s) 130A-130N.

At block 408, the controller 110 is to insert the wireless scan data 132 as part of a media metadata 118. For instance, the controller 110 is to insert the wireless scan data 132 as part of media metadata 118 corresponding to media that has been captured within a predefined period of time. The controller 110 may store the wireless scan data 132 within a field of the media metadata 118 or in other suitable manners.

At block 410, the controller 110 may output the media metadata 118 to the computing apparatus 140. As discussed herein, the controller 110 may identify the wireless scan data 132 from the media metadata 118 and may determine an approximate location of the radio 130A that communicated the wireless scan data 132. The controller 110 may store the determined approximate location of the radio 130A with the media metadata 118 such that the approximate location may be used to approximate the location of the media.

Turning now to FIG. 5, at block 502, the controller 110 is to determine that a media has been captured, for instance, by the imaging component 104 on the wearable device 102. At block 504, the controller 110 is to generate or otherwise access an identifier of the captured media. The imaging component 104, the controller 110, or other component may generate the identifier of the captured media. The identifier may be any suitable combination of letters, numbers, and/or characters that may be unique among identifiers of media captured by the imaging component 104. At block 506, the controller 110 may output a notification that contains the identifier. For instance, the controller 110 may output the notification to the computing apparatus 140. At block 508, the controller 110 may output the media data and the media metadata 118 to the computing apparatus 140.

Turning now to FIG. 5B, at block 522, the processor 142 of the computing apparatus 140 may receive the notification including the identifier of the media. At block 524, in response to receipt of the notification, the processor 142 may determine a location of the computing apparatus 140, for instance, through use of a GPS receiver. At block 526, the processor 142 may generate a tuple that includes the identifier and a current location identification of the computing apparatus 140. In addition, at block 528, the processor 142 may insert the current location identification into the media metadata 118. In other words, when the media data and the media metadata 118 are received, the processor 142 may associate location information of the computing apparatus 140 with the media such as by inserting the location information into the media metadata 118. The media metadata 118 may thus be geotagged with the location information.

Figure 6:
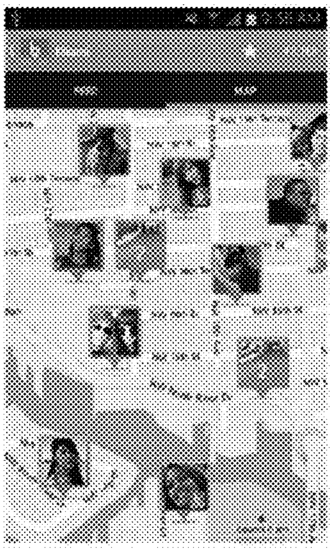
FIG. 6 illustrates a map including media arranged in the map according to the locations at which the media were captured, according to an example.

In some examples, the geotagging of the media as described herein may enable media captured at common locations to be identified. In addition, or alternatively, the geotagging of the media may enable the media to be displayed in a map according to the locations at which the media were captured. A non-limiting example of a map 600 including media arranged in the map 600 according to the locations at which the media were captured is illustrated in FIG. 6.

Figure 7:
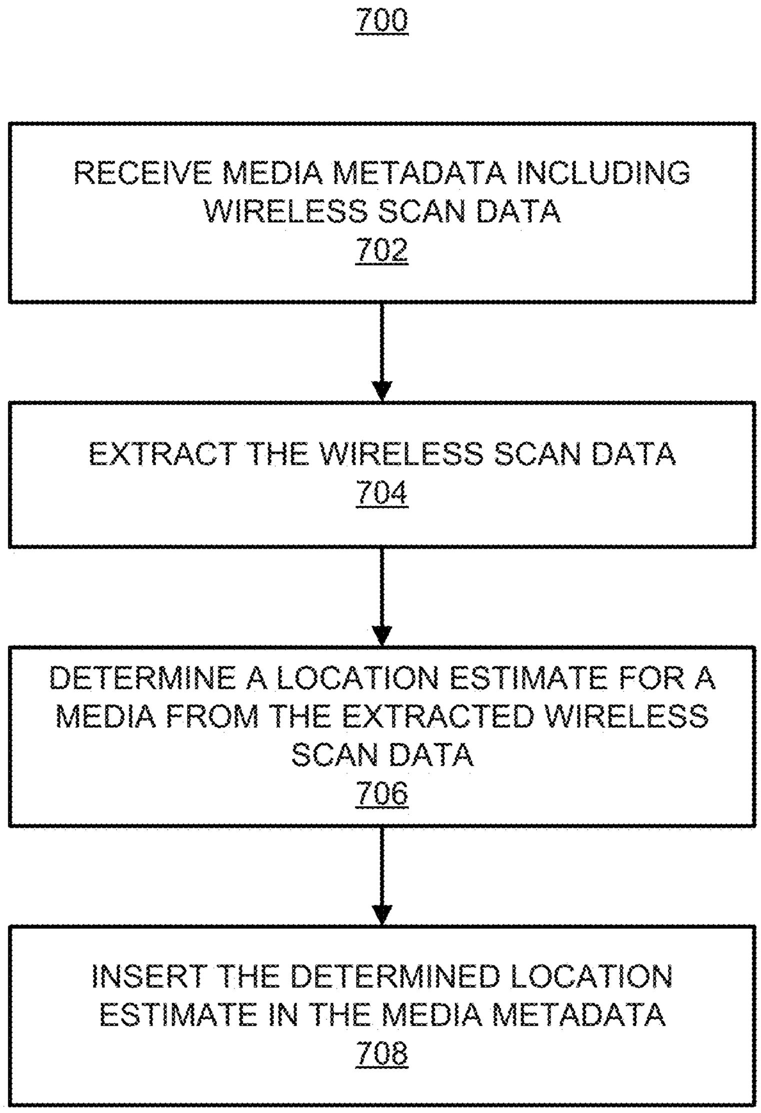
FIG. 7 illustrates a flow diagram of a method for determining a location estimate of a media from wireless scan data, according to an example.

Various manners in which the processor 142 of the computing apparatus 140 may operate are discussed in greater detail with respect to the method 700 depicted in FIG. 7. FIG. 7 illustrates a flow diagram of a method 700 for determining a location estimate of a media from wireless scan data 132, according to an example. It should be understood that the method 700 illustrated in FIG. 7 may include additional operations and that some of the operations described therein may be removed and/or modified without departing from the scope of the method 700. The description of the method 700 is made with reference to the features depicted in FIGS. 1-3 for purposes of illustration.

At block 702, the processor 142 may receive media metadata 118 from a wearable device 102, in which the media metadata 118 includes wireless scan data 132. At block 704, the processor 142 may extract the wireless scan data 132 from the media metadata 118. At block 706, the processor 142 may determine a location estimate for a media corresponding to the media metadata 118 from the extracted wireless scan data 132. As discussed herein, the processor 142 may determine the location estimate through use of a localization service 150 or through access to a local database. At block 708, the processor 142 may insert the determined location estimate for the media in the media metadata 118.

For instance, the processor 142 may make a call to a localization service 150 with the wireless scan data 132, in which the localization service 150 is to determine the location estimate of the radio 130A that provided the wireless scan data 132. In addition, the processor 142 may receive the location estimate for from the localization service 150 and may determine the location estimate of the media from the received location estimate of the radio 130A. As another example, the processor 142 may access information directed to correlations between wireless scan data 132 and radio 130A-130N locations and may determine the location estimate for the media from the accessed information.

As discussed herein, the processor 142 may also or alternatively, receive a notification from the wearable device 102, in which the notification includes an identifier of the media metadata 118. In these examples, the processor 142 may determine a current location of the computing apparatus 140, for instance, using a GPS receiver, or other location determination method. The processor 142 may also create a tuple that includes the identifier of the media metadata 118 and a current location identification of the computing apparatus 140. The tuple may be used to geotag media metadata 118 such as by populating the media metadata with the current location identification.

Some or all of the operations set forth in the methods 400, 500, 520, and 700 may be included as utilities, programs, or subprograms, in any desired computer accessible medium. In addition, the methods 400, 500, 520, and 700 may be embodied by computer programs, which may exist in a variety of forms both active and inactive. For example, they may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 8:
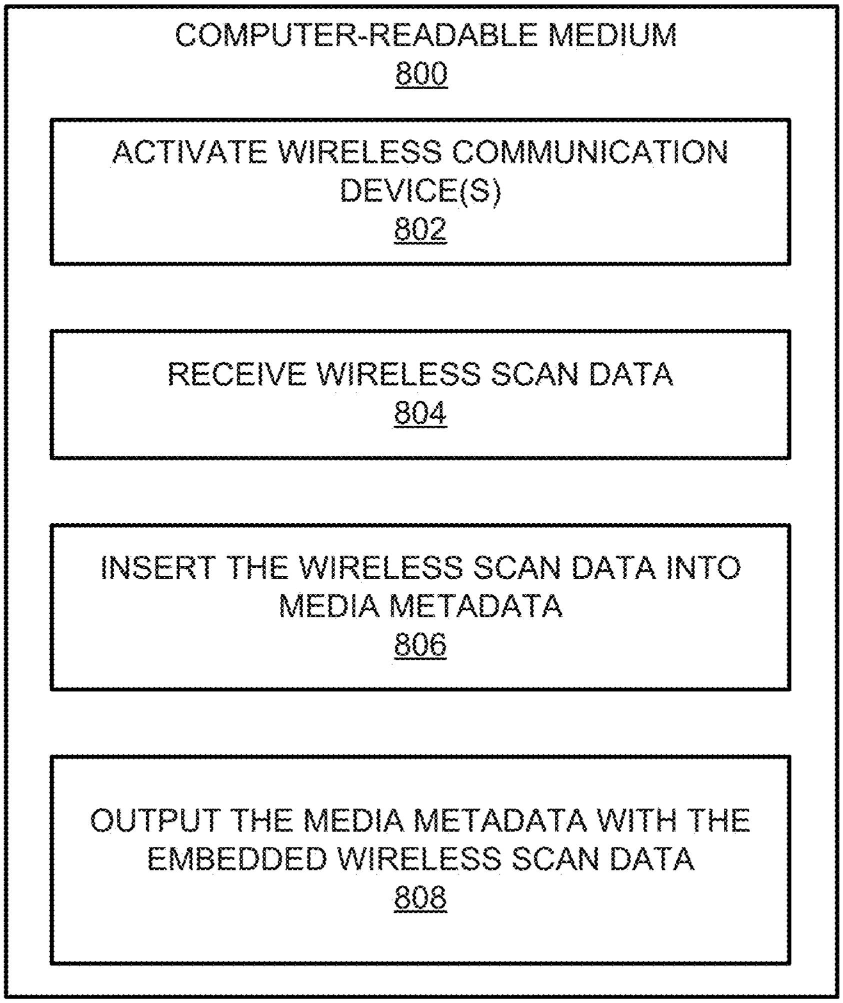
FIG. 8 illustrates a block diagram of a computer-readable medium that has stored thereon computer-readable instructions for inserting wireless scan data into media metadata to enable location estimates of media associated with the media metadata to be determined, according to an example.

Turning now to FIG. 8, there is illustrated a block diagram of a computer-readable medium 800 that has stored thereon computer-readable instructions for embedding wireless scan data 132 into media metadata 118 to enable location estimates of media associated with the media metadata 118 to be determined, according to an example. It should be understood that the computer-readable medium 800 depicted in FIG. 8 may include additional instructions and that some of the instructions described herein may be removed and/or modified without departing from the scope of the computer-readable medium 800 disclosed herein. In some examples, the computer-readable medium 800 is a non-transitory computer-readable medium, in which the term "non-transitory" does not encompass transitory propagating signals.

The computer-readable medium 800 has stored thereon computer-readable instructions 802-808 that a controller, such as the controller 110 of the wearable device 102 depicted in FIG. 1 is to execute. The computer-readable medium 800 is an electronic, magnetic, optical, or other physical storage device that contains or stores executable instructions. The computer-readable medium 800 is, for example, Random Access memory (RAM), an Electrically Erasable Programmable Read-Only Memory (EEPROM), a storage device, or an optical disc.

The controller may fetch, decode, and execute the instructions 802 to activate one or more wireless communication components 114 to perform a wireless scan of radios 130A-130N available to respond to the wireless scan. The controller may fetch, decode, and execute the instructions 804 to receive wireless scan data 132 from at least one of the radios 130A-130N. The controller may fetch, decode, and execute the instructions 806 to embed the wireless scan data 132 as part of a media metadata 118. In addition, the controller may fetch, decode, and execute the instructions 808 to output the media metadata 118 with the embedded wireless scan data 132, for instance, to the computing apparatus 140.

In the foregoing description, various inventive examples are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples.

The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example' is not necessarily to be construed as preferred or advantageous over other embodiments or designs.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

The invention claimed is:

1. A computing apparatus, comprising:

at least one wireless communication component;

a processor; and a memory on which is stored machine-readable instructions, which when executed, cause the processor to:

receive a notification that contains a media identifier of media captured by an imaging component of a wearable device, from the wearable device, wherein the wearable device is distinct and separate from the computing apparatus;

activate the at least one wireless communication component to perform a wireless scan of at least one radio available to respond to the wireless scan;

receive, through the at least one wireless communication component, wireless scan data from the at least one radio, wherein the wireless scan data is obtained without using a global positioning system (GPS) receiver;

determine a location estimate for the media from the wireless scan data; and associate the determined location estimate for the media with the media identifier.

2. The computing apparatus of claim 1, wherein the instructions cause the processor to:

render the media on a map according to the determined location estimate for the media.

3. The computing apparatus of claim 1, wherein the instructions cause the processor to:

make a call to a localization service with the wireless scan data, wherein the localization service is to determine a location of the at least one radio that provided the wireless scan data;

receive the location estimate for the media from the localization service; and determine the location estimate for the media based on the determined location of the at least one radio.

4. The computing apparatus of claim 1, wherein the instructions cause the processor to:

access correlations between wireless scan data and locations of radios; and determine the location estimate for the media from the accessed correlations.

5. The computing apparatus of claim 1, wherein the memory further comprises instructions that, when executed, cause the processor to:

receive, from the wearable device, media and corresponding media metadata captured by the imaging component of the wearable device, wherein the media metadata contains another media identifier; and based on a determination that the other media identifier corresponds to the media identifier associated with the determined location estimate:

insert the determined location estimate for the media in the media metadata.

6. The computing apparatus of claim 1, wherein the computing apparatus is a wrist-wearable device and the wearable device is a head-wearable device.

7. The computing apparatus of claim 1, wherein the memory further comprises instructions that, when executed, cause the processor to:

activate the at least one wireless communication component to receive the wireless scan data periodically; and cache the received wireless scan data.

8. The computing apparatus of claim 1, wherein the memory further comprises instructions that, when executed, cause the processor to:

determine a schedule of when the at least one wireless communication component is to be activated to perform the wireless scan of the at least one radio based on a context associated with the computing apparatus; and activate the at least one wireless communication component according to the determined schedule.

9. The computing apparatus of claim 8, further comprising:

a battery, wherein the context associated with the computing apparatus comprises a condition or operation of the computing apparatus in which a life of the battery is to be enhanced.

10. The computing apparatus of claim 8, wherein the context associated with the computing apparatus comprises a physical location of the computing apparatus over a period of time.

11. The computing apparatus of claim 1, wherein the at least one wireless communication component is to perform a wireless scan of the at least one radio through one or more of a wireless fidelity connection, a short-range wireless connection, and a cellular connection with the at least one radio.

12. A method comprising:

at a computing apparatus:

receiving a notification that contains a media identifier of media captured by an imaging component of a wearable device, from the wearable device, wherein the wearable device is distinct and separate from the computing apparatus;

activating at least one wireless communication component to perform a wireless scan of at least one radio available to respond to the wireless scan;

receiving, through the at least one wireless communication component, wireless scan data from the at least one radio, wherein the wireless scan data is obtained without using a global positioning system (GPS) receiver;

determining a location estimate for the media from the wireless scan data; and associating the determined location estimate for the media with the media identifier.

13. The method of claim 12, further comprising:

receiving, from the wearable device, media and corresponding media metadata captured by the imaging component of the wearable device, wherein the media metadata contains another media identifier; and based on a determination that the other media identifier corresponds to the media identifier associated with the determined location estimate:

inserting the determined location estimate for the media in the media metadata.

14. The method of claim 12, wherein the computing apparatus is a wrist-wearable device and the wearable device is a head-wearable device.

15. The method of claim 12, further comprising:

rendering the media on a map according to the determined location estimate for the media.

16. The method of claim 12, further comprising:

making a call to a localization service with the wireless scan data, wherein the localization service is to determine a location of the at least one radio that provided the wireless scan data;

receiving the location estimate for the media from the localization service; and determining the location estimate for the media based on the determined location of the at least one radio.

17. The method of claim 12, further comprising:

accessing correlations between wireless scan data and locations of radios; and determining the location estimate for the media from the accessed correlations.

18. The method of claim 12, further comprising:

activating the at least one wireless communication component to receive the wireless scan data periodically; and caching the received wireless scan data.

19. The method of claim 12, further comprising:

determining a schedule of when the at least one wireless communication component is to be activated to perform the wireless scan of the at least one radio based on a context associated with the computing apparatus; and activating the at least one wireless communication component according to the determined schedule.

* * * * *